US008005897B1

(12) United States Patent
Roka et al.

(10) Patent No.: US 8,005,897 B1
(45) Date of Patent: Aug. 23, 2011

(54) CONTACT LIST CLIENT SYSTEM AND METHOD

(75) Inventors: Pujan K. Roka, Olathe, KS (US); Kevin E. Hunter, Del Mar, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 523 days.

(21) Appl. No.: 12/053,485

(22) Filed: Mar. 21, 2008

(51) Int. Cl.
*G06F 15/16* (2006.01)

(52) U.S. Cl. ........................................ 709/205; 709/206

(58) Field of Classification Search .................. None
See application file for complete search history.

(56) References Cited

U.S. PATENT DOCUMENTS

| | | | |
|---|---|---|---|
| 6,549,937 B1* | 4/2003 | Auerbach et al. | 709/206 |
| 6,859,527 B1* | 2/2005 | Banks et al. | 379/106.03 |
| 7,333,976 B1* | 2/2008 | Auerbach et al. | 1/1 |
| 7,606,865 B2* | 10/2009 | Kumar et al. | 709/206 |
| 2004/0054737 A1* | 3/2004 | Daniell | 709/206 |
| 2004/0193722 A1* | 9/2004 | Donovan | 709/230 |
| 2005/0002057 A1* | 1/2005 | Oe | 358/1.15 |
| 2005/0164651 A1* | 7/2005 | Ollis et al. | 455/100 |
| 2006/0035632 A1* | 2/2006 | Sorvari et al. | 455/418 |
| 2006/0069727 A1* | 3/2006 | Fuller et al. | 709/206 |
| 2006/0189348 A1* | 8/2006 | Montulli et al. | 455/556.1 |
| 2007/0016828 A1* | 1/2007 | Luo et al. | 714/38 |
| 2007/0161382 A1* | 7/2007 | Melinger et al. | 455/456.1 |
| 2007/0226184 A1* | 9/2007 | Diraimondo et al. | 707/3 |
| 2007/0280452 A1* | 12/2007 | Bernard | 379/201.01 |
| 2008/0071544 A1* | 3/2008 | Beaufays et al. | 704/270.1 |
| 2008/0301310 A1* | 12/2008 | Pulver et al. | 709/229 |
| 2009/0005116 A1* | 1/2009 | Sharma et al. | 455/557 |
| 2009/0093242 A1* | 4/2009 | Bhalekar et al. | 455/418 |
| 2009/0106369 A1* | 4/2009 | Chen et al. | 709/206 |
| 2009/0176498 A1* | 7/2009 | Colon | 455/445 |
| 2009/0198777 A1* | 8/2009 | Lafreniere et al. | 709/206 |
| 2009/0216569 A1* | 8/2009 | Bonev et al. | 705/5 |
| 2009/0240657 A1* | 9/2009 | Grigsby et al. | 707/3 |
| 2009/0320050 A1* | 12/2009 | Pousti et al. | 719/328 |
| 2010/0016003 A1* | 1/2010 | Shapiro et al. | 455/466 |

OTHER PUBLICATIONS

Parviainen, et al., "Mobile Instant Messaging," http://www.cdt.luth.se/~rolle/docs/ict2003/mim.html, printed from the World Wide Web Dec. 4, 2006.

Trillian Online User Manual, printed from archive.org internet archive (as a record of http://www.ceruleanstudios.com/support/manual.php), indicated by archive.org to have an online publication date of Nov. 30, 2007. Excludes the section labeled "What Trillian is", as that section was unavailable at archive.org.

Trillian Online User Manual "What Trillian is" page, printed from archive.org internet archive (as a record of http://www.ceruleanstudios.com/support/manual.php), indicated by archive.org to have an online publication date of Jul. 4, 2007.

* cited by examiner

*Primary Examiner* — Bunjob Jaroenchonwanit

(57) ABSTRACT

A contact list client application running on a client device operates to request and receive contact lists over a network from a plurality of different contact list servers, and the application stores the contacts from these lists in a merged contact list. When a user selects a contact in the merged list, the contact list client application identifies one out of a plurality of communication applications on the client device and causes the identified communication application to initiate communications with the contact. Contact lists that relate to different communications formats, such as voice communications, SMS (short message service) messages, and email can be integrated into a single client view on the client device.

14 Claims, 4 Drawing Sheets

CONTACT LIST CLIENT SYSTEM AND METHOD

BACKGROUND

This disclosure relates to a system and method for maintaining contact list information for electronic communications.

The number of different ways people can communicate electronically continues to multiply. Communications can be conducted through, for example, dial-up or push-to-talk voice calls, through electronic mail, or through text messaging. Each of these types of communications, moreover, may be conducted using different networks or protocols, and any individual may make use of more than one of those networks and protocols. For example, it would not be unheard of for an individual to have a mobile telephone, a POTS ("plain old telephone system") telephone, and an Internet-based telephone, a Microsoft Exchange email account for work, a Web-based email account for non-work messages, and AOL and .NET instant messaging applications. As the number of different ways to contact individuals increases, the difficulty of keeping track of those individuals' contact information also increases.

When individuals are collected into various group lists, contact lists, and buddy lists, the difficulty of keeping these lists updated and relevant is compounded by the fact that the named individuals can often be contacted through any one or more of various networks and services, such as those described above. For example, a work-related email contact list may be updated regularly by in-house IT staff, but at various times throughout the day or week, some individuals in the contact list may best be contacted not through their work email accounts, but rather through other networks or services that do not feature a regularly-updated contact list.

This can be true even where multiple services are offered by a single device, as can be the case for a wireless device such as a mobile telephone. Even on a single device, each one of the multiple communication services offered through the device is often enabled by its own application program. Each of these application programs may maintain a contact list of its own that may or may not be shared with other communication applications.

Keeping track of contacts becomes even more challenging when a user relies on multiple devices to keep in communication. For example, a user may keep a text messaging and/or email applications on his wireless device and on his desktop computer. The user may even use the same email and/or instant messaging account to communicate both at the desktop and the wireless device, but contact lists on the desktop and on the wireless device can diverge if they are not synchronized.

At least one available communication service, the ICQ instant messaging service, assists users in keeping track of instant messaging contact lists by offering a server-side contact list. See, e.g., R, Parviainen, "Mobile Instant Messaging," available at http://www.cdt.luth.sek-rolle/docs/ict2003/mim-.html.

The Trillian instant messaging client is a chat client that supports several different chat services, and that incorporates contacts from each of the supported chat media into a single contact list. See Trillian Online User Manual, available at http://www.ceruleanstudios.com/support/manual.php.

SUMMARY

In one example of a contact list method, a client device receives a contact list client application over a network. The client application operates to request and receive contact lists over a network from a plurality of different contact list servers, and the application stores the contacts from these lists in a merged contact list. When a user selects a contact in the merged list, the contact list client application identifies one out of a plurality of communication applications on the client device and causes the identified communication application to initiate communications with the contact. If the user of the client application modifies a contact in the merged contact list, the client application identifies which of the contact list servers is associated with the client application and conveys the modifications to the identified contact list server. Contact lists that relate to different communications formats, such as voice communications, SMS (short message service) messages, and email can be integrated into a single client view.

DETAILED DESCRIPTION

I. Overview of an Exemplary Embodiment

Figure 1:
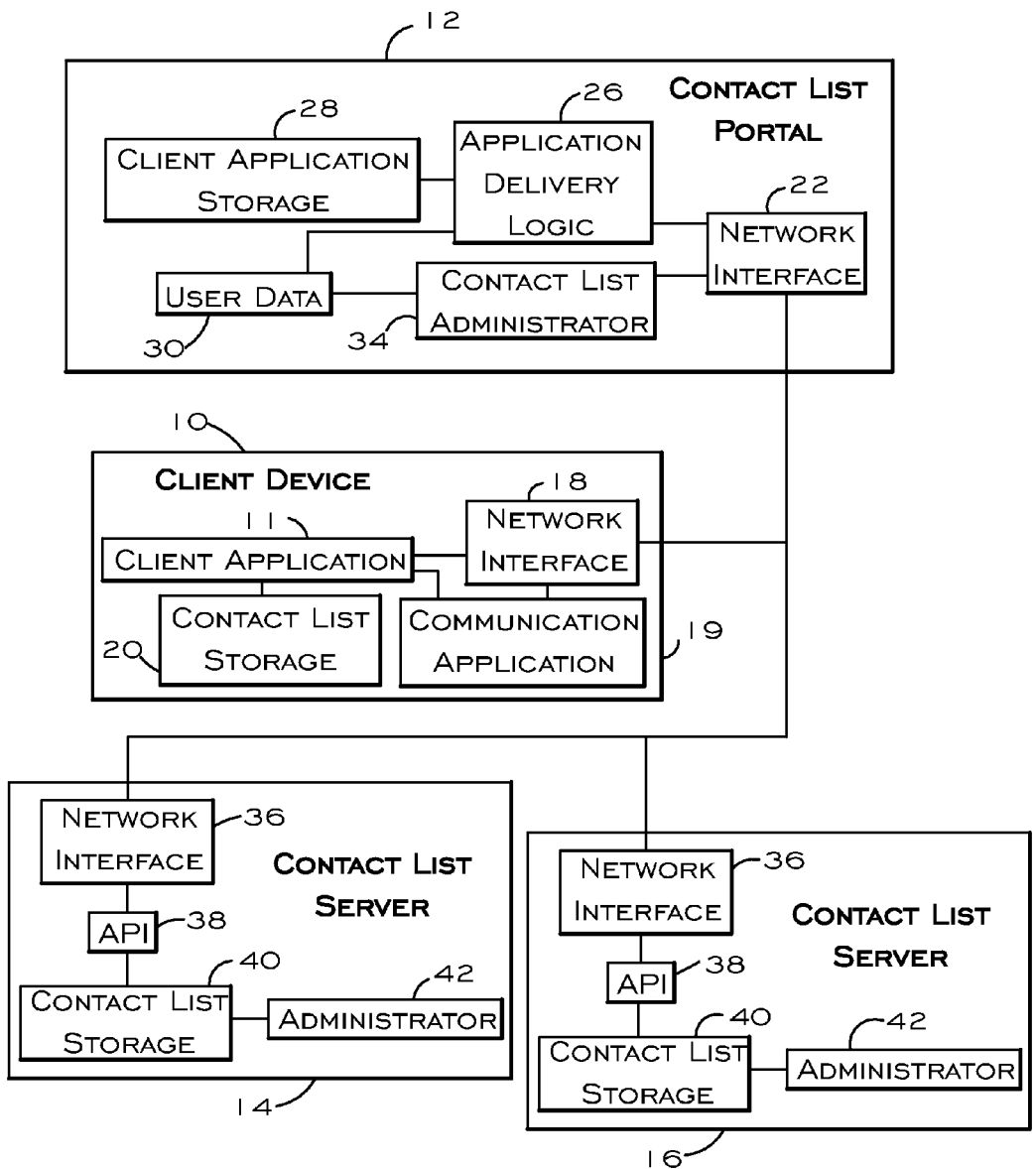
FIG. 1 is a schematic block diagram illustrating the functional architecture of a contact list system.

In an exemplary embodiment of a contact list system, a client device, a contact list portal, and one or more contact list servers interact to provide a user with up-to-date contact list information.

A client device, such as a mobile telephone, receives a contact list client application from the contact list portal. The contact list client application may be installed on the client device, or it may be, for example, an Internet-based script that is downloaded only as needed by the client device. The contact list portal is, in this embodiment, a Web-based portal accessible by the client device. Each contact list server is a networked server that stores contact list information for at least one communications service. The contact list server may be associated with a telecommunications service provider.

Contact list material may be in the form of a table or other data structure, preferably a data structure having an open-ended number of entries. Each entry may contain information such as, for example, an individual's name, one or more telephone numbers, one or more email addresses, one or more SMS or other text messaging addresses, one or more Post Office addresses, among others. The entry may contain further information for each such address or phone number, such as, for phone numbers, information as to whether the number is a voice number or a fax number, and information as to whether the number pertains to the individual's home or work. Similar information may be provided for electronic mail and other addresses. Similar entries may be provided as contact information for a company, department, or other organization, rather than for a particular individual.

Each entry in a collection of contact list material is referred to herein as a contact. Typically, it is desirable for there to be a one-to-one relationship between each contact and a particular individual or groups. However, it is to be understood that either intentionally or otherwise, more than one contact may include material relating to a single individual or organization.

In one operation of a contact list system, the contact list client queries a plurality of contact list servers at preconfigured intervals to retrieve a respective contact list from each of the servers. The contact list client receives a first contact list from a first contact list server and second contact list from a second contact list server. The contact list client application then creates a merged contact list, containing contacts from both the first and second contact lists, and makes it available to the user of the client device. In this operation of the contact list system, the user of the client device can locate contacts through a single application, even if those contacts pertain to different communications services.

In another operation of a contact list system, the contact list client application maintains a merged contact list. The user of the client device may edit information in the merged contact list, such as by adding or changing information associated with a particular contact. For any edited entry in the contact list, the contact list client identifies the contact list server with which the contact is associated and then conveys contact list changes as necessary to that associated contact list server. In this way, the user of the client device can update contacts through a single application, even if those contacts pertain to different communications services.

The client application may request to receive only a portion of a contact list at a time. In this way, a user can scroll, page, or otherwise browse through the merged contact list as if the entire list were stored on the client device, but the resources of the client device need not be taxed by downloading or storing the entire merged contact list.

II. A Contact List System

An exemplary contact list system is illustrated in FIG. 1. The system as illustrated includes a client device 10 operating a client application 11, a contact list portal 12, and two contact list servers 14 and 16. The features of these components of the contact list system are described in further detail below.

A. Client Device

The client device 10 is a user operable electronic device that is capable of communicating over a network through a wireless and/or wired connection. The client device 10 may be, for example, a mobile device such as a mobile telephone communicating over a CDMA network, or a laptop or desktop personal computer capable communicating over a local area network and/or a telecommunications network. The network communications are managed by one or more network interfaces 18.

The client device is provided with one or more communications applications 19. A communications application enables the client device to communicate through one or more media with an individual or group listed in a contact list. A communications application may be, for example, an instant messaging application (such as an SMS application or chat application), an email application, or a voice communications application, among others. Each of the communications applications may include contact list functionality of its own. For example, an email application may store a contact list of email addresses, and an AOL Instant Messenger chat application may store a buddy list.

B. Client Application

The client application 11 includes software instructions that can be stored either temporarily or permanently in a memory of the client device. These instructions can be executed by a processor (with or without the intermediation of an interpreter) of a client device. Where the client device provides an implementation of a Java 2 Platform, Micro Edition (J2ME) and/or a Binary Runtime for Wireless (BREW) platform, the client application 11 may be coded to operate on the available platforms.

The client application may be installed in the client device, e.g. during provisioning, or the client application may be downloaded from the contact list portal or from another source only when needed by the user of the client device.

The client application makes use of contact list storage 20. The contact list storage 20 locally stores contact list information that is accessible to the client application 11. The locally-stored contact information may include all or part of a merged contact list, and it may include long-term storage (such as storage that persists even when the client device is not in communication with the contact list portal) and/or a short-term cache (which may be used only when the client device is in communication with the contact list portal, and possibly for a short time thereafter).

C. Contact List Portal

In a preferred embodiment, each client device 10 can communicate with the contact list portal 12 over the Internet. One or more network interfaces 22 manage the network communications of the contact list portal. The contact list portal may be, but need not be, operated by a telecommunications service provider.

In embodiments in which one or more of the client devices downloads the client application 11 only on an as-needed basis, the contact list portal is provided with application delivery logic 26 and with client application storage 28. The client application storage 28 stores one or more versions of the contact list client application, where different versions may operate on different platforms (e.g., as a J2ME application, a BREW application, a Java or other applet, or a compiled application for Windows or Macintosh computers), or different versions may offer different levels of contact-list management functionality.

In response to a request from a client device, a request that may be made by visiting a Web page operated by the contact list portal, the application delivery logic 26 of the contact list portal selects an appropriate version of the client application for the client device, retrieves the appropriate version of the client application from the client application storage 28, and sends it to the client device. The application delivery logic 26 may, if desired, implement any digital rights management and/or trusted computing requirements for the distribution of the client application. This can be done where, for example, the client application is offered as a premium service. The contact list portal 12 is provided with user data 30, which can include information on each client device and/or on the user of each client device. The user data 30 may include, for example, information identifying whether or not the user has a license to use the client application, and which version or versions the user is authorized or able to download. The user data 30 may also track usage patterns.

The contact list portal may be implemented by one or more general purpose computers equipped with a memory that stores software instructions and a processor that executes the instructions to perform the functions described herein.

D. Contact List Administrator

The operation of the contact list portal 12 and/or of the client application 11 can be tailored through a contact list administrator application 34. The contact list administrator 34 is a back office administrative tool, which may be Web-based, which allows a user of the client device to identify the contact list servers (such as servers 14 and 16) from which contact list information will be retrieved. As an example, a user may provide the contact list administrator application with, a set of URLs or other information identifying the contact list servers from which the contact list portal is to retrieve contact list data. For example, the user may identify a MS Exchange Server and Yahoo! contact list server. The user may further provide user names and passwords that can be used to access each of the contact list servers. The information provided by the user may be stored with the user data 30. In an embodiment in which the client device receives the contact list application on an as-needed basis only, information from user data 30 maybe provided along with the client application software so that the user of the client device need not re-enter setup information. Alternatively, or in addition, the client device 10 may itself store at lest some of the relevant user data.

Along with identifying the contact list servers, a user may, through the contact list administrator, otherwise personalize the operation of the client application. In one embodiment, the contact list administrator allows the user to select the frequency at which the client application communicates with contact list servers to update the merged contact list. The update frequency may be different for different contact list servers. The contact list administrator may also allow a user to select whether to cache the merged contact list, or, as an alternative, whether to re-construct the merged contact list with each request by the user. In some embodiments, information from some contact list servers may be cached while information from other contact list servers is retrieved on an as-needed basis.

As a security feature, the contact list administrator may require that access by a user be made using a particular client device. Where the client device is a mobile telephone or other mobile device, a Web site through which the contact list administrator is accessed may be optimized for access by a mobile device. A user of such a client device can, for example, enter the URLs of contact list servers using triple-tap text entry.

In some embodiments, the contact list administrator can be accessed by a device different from the client device that operates the contact list client application. For example, a different access device such as a desktop or laptop computer with an Internet connection and browser software can be used to access the contact list administrator through a Web site. Based on setup information entered through the Web site, the contact list administrator can communicate with the client device to provide the setup information to the contact list client application.

The contact list administrator may be implemented as a software program operating on the same computer or computers as the contact list server. Alternatively, the contact list administrator may be implemented by one or more other general purpose computers equipped with a memory that stores software instructions and a processor that executes the instructions to perform the functions described herein.

E. Contact List Server

The contact list client application 11 operates to collect contact list information from at least one, and preferably more than one contact list server, such as servers 14 and 16. Each of the contact list servers 14 and 16 is preferably associated with a respective communications service. For example server 14 may be associated with a Microsoft Exchange service and server 16 may be associated with a Yahoo! instant messaging service. Each contact list server is provided with a network interface 36 that enables communication with the contact list client. The contact list servers may themselves offer the communication services with which they are associated, or the contact list servers may be associated with but operated on different computers from the servers used to provide the communications services.

The contact list servers are preferably provided with an application programming interface (API) 38 through which the contact list client can make requests for contact list data. Each contact list server is provided with contact list storage 40, which may take the form of a database, and which stores contact information pertaining to the associated communication service. The contact list storage 40 in each contact list server may be updatable by an administrator 42 without the intervention of a client device. For example, where the contact list server 14 is a Microsoft Exchange server operated by a user's employee, the administrator 42 may update contact lists stored in the contact list storage 40 to reflect changes in staffing without input from the client device 10.

Preferably, the API of the contact list servers offer authentication and non-repudiation functionality, for example by requiring a user name and password associated with a particular user and/or client device.

II. A Contact List Method

A. Downstream Contact List Updates

Figure 2:
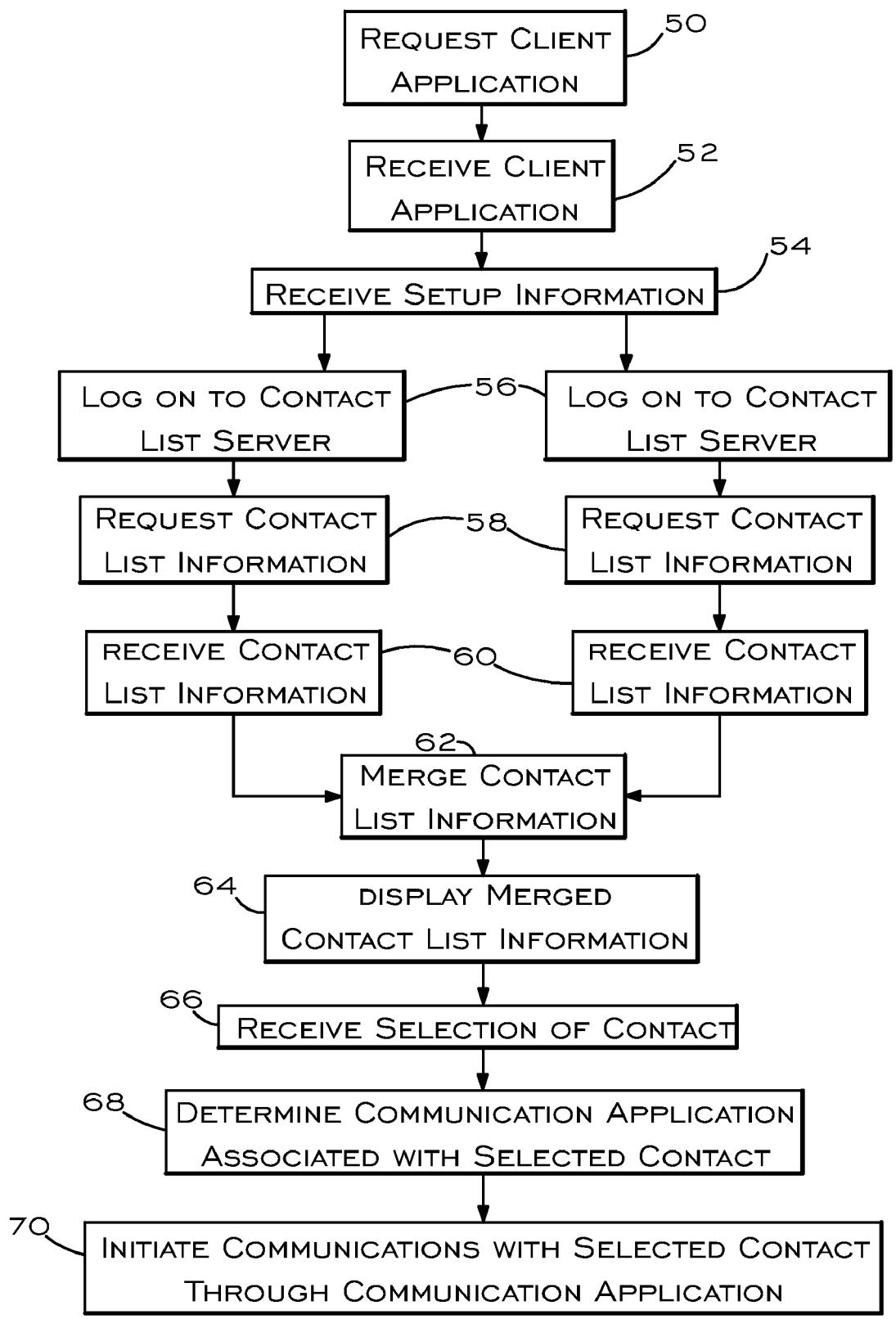
FIG. 2 is a flow diagram illustrating a contact list method performed at a client device.

A method performed at a client device, such as a mobile telephone, is illustrated in FIG. 2. In particular, FIG. 2 illustrates many of the steps involved in starting up the client application, receiving contact lists from remote servers, presenting the lists to a user of the mobile device, and using the contact list application to initiate communications with a contact.

In step 50, the client device requests the client application software from the contact list portal. In step 52, possibly after the user of the client device has made any necessary payment and/or has otherwise demonstrated or acquired authorization to use the software, the client device receives the contact list client application. If setup information is available, such as URLs, usernames, and passwords of one or more contact list servers, the client device receives such information from the portal in step 54; otherwise, such information may be retrieved from a storage location on the client device itself or may be entered by the user of the client device.

In the steps illustrated in FIG. 2, the client application obtains contact information from two contact list servers. However, it should be understood that any number of contact list servers, preferably at least two contact list servers, may provide the client application with contact information.

In step 56, the client application logs on to the contact list servers, and in step 58, the client application requests the contact list information from the servers. In step 60, the client application receives the contact lists from the contact list servers. These steps 56-60 may be performed by, for example, interacting with APIs of the contact list servers. These steps may be preformed on an as-needed basis or may be performed periodically at a frequency selected by a user and stored in the setup information.

In step 62, if more than one contact list has been retrieved, the client application may merge and sort the contact list information from more than one contact list. As an alternative, information from different contact lists can be kept separate by the client application and may, for example, be arranged in different folders or subdirectories at the client device. In embodiments in which the client device locally stores a version the contact list, the information received from the contact list servers may be used to update the locally-stored contact lists.

In step 64, the client application displays contacts from one or more of the contact lists to a user of the client device. The contacts may be displayed in a single, merged contact list or may be arranged under separate folders, for example. Contacts within the contact lists may be made accessible by a search function.

Once one or more contacts can be displayed to a user, the user is given the opportunity to initiate communications with a contact. The user may select a contact through a touch screen on the client device or otherwise, for example by moving a cursor and pressing a button to make a selection on the client device. Where different ways of communicating with a contact (both an email address and a phone number, for example) are made available, the user may use similar selection features to select which one of those communications methods to use. In step 66, the client application receives information identifying the user's selection for initiating communications with a contact. In step 68, the client application determines which communications application is associated with the client's selection. In step 70, the client application initiates communications with the selected contact, preferably by calling the API of the communications application associated with the client's selection. In this way, communications are initiated directly from the contact list client application. In particular, communications through any of a plurality of different communications applications can all be initiated through the same contact list client application.

B. Upstream Contact List Updates

In a method performed at the client device, a contact list application permits a user to revise and update contact list information transparently, without requiring the user to log into each individual contact list server, or even necessarily to remember on which server the contact is stored.

Figure 3:
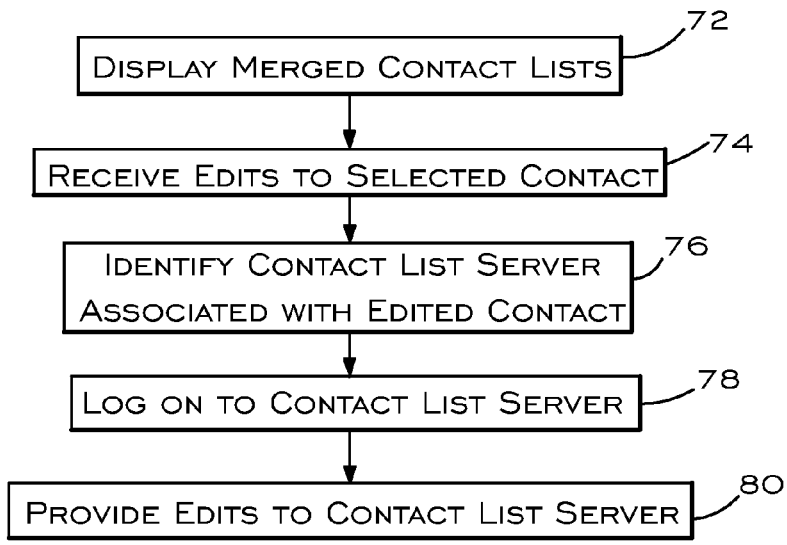
FIG. 3 is a flow diagram illustrating an upstream update method performed at a client device.

In step 72, illustrated in FIG. 3, the client device displays the contact lists, and in step 74, the client application receives additions, deletions, or modifications to a contact in the contact lists. If the client device is a mobile telephone, these edits may be made through, for example, a triple-tap text entry interface or other button or touch-screen interface.

In step 76, the client application determines which contact list server or servers is associated with the edited contact. In step 78, the client application logs in to the appropriate contact list server and in step 80, the client application communicates the contact list revisions to the server.

C. Browsing Merged Contact Lists

Figure 4:
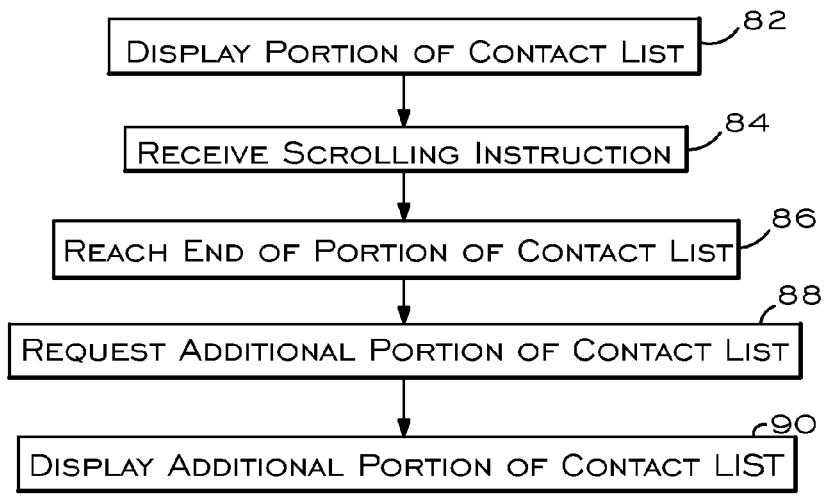
FIG. 4 is a flow diagram illustrating a contact list browsing method performed at a client device.

As illustrated in FIG. 4, an embodiment of the contact list client application enables a user to browse through contact lists without needing to download or store the complete contact lists. In step 82, the client application causes a portion of the contact list to be displayed on the client device. In step 84, the client application receives a browsing instruction through the user interface of the client device, such as an instruction to scroll or page through the contact list. If this instruction causes the client application to reach the end of the displayed portion of the contact list (step 84), the client application communicates with the contact list server in step 88 to request an additional portion of the contact list. The client application then causes the additional portion of the contact list to be displayed in step 90. The operation of retrieving portions of the contact list at different times can be performed transparently to the user, who need not be aware that the entire contact list is not at all times stored locally on the client device.

D. Client Interface

Figure 5:
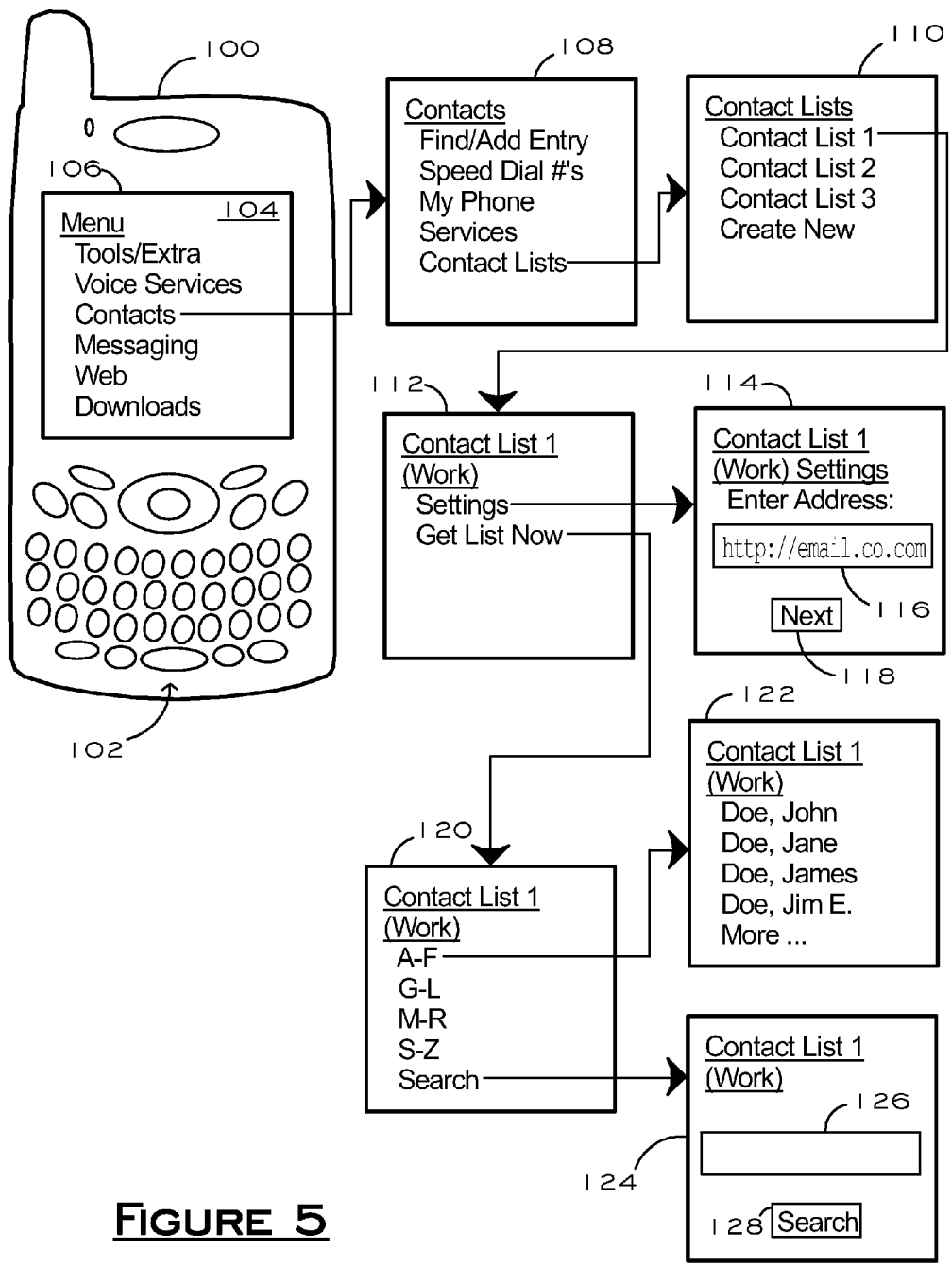
FIG. 5 is a schematic illustration of the user interface of a contact list client application operating on a client device.

An embodiment of a client interface for the contact list client application is illustrated in FIG. 5. The client interface is shown in an embodiment in which the client device is a mobile telephone 100 with an alphanumeric keypad 102 and touch-sensitive LCD screen 104.

As shown in screen 106, the user interface displays a menu of choices for user data entry. One of these choices is the "contacts" menu item. On selection of the "contacts" menu item, the user interface displays screen 108, which includes a menu that has a "contact lists" menu item. In selection of the "contact lists" menu item, the user interface displays screen 110, the contact lists menu. Screen 110 allows a user to chose from among a plurality of contact lists. (Listed in the illustration are "contact list 1," "contact list 2," and "contact list 3.") Screen 110 further allows selection of the "create new" menu item to enable the user to create a new contact list.

Each of the different contact lists identified in the menu screen 110 may correspond to a contact list obtained (or obtainable) from a different contact list server. In alternative embodiments, there may not be a one-to-one correspondence between contact lists and contact list servers. For example, a single contact list on the user device 100 may include contacts from more than one contact list server, and/or a single contact list server may provide contacts for more than one of the contact list servers.

Upon selection of one of the existing contact lists, the user interface displays screen 112, which shows the result of selecting "contact list 1" from the menu on screen 110. In the menu of screen 112, the user is prompted to choose either the "settings" option or the "get list now" option.

If the user selects the "settings" option from screen 112, the user interface displays screen 114. Screen 114 provides a text box 116 into which the user can enter the URL of a contact list server. Through selection of a "next" button 118, a user may further be given the option to change other settings, such as the frequency at which the contact list will be updated from the contact list server.

If, instead of selecting the "settings" option from screen 112, the user selects the "get list now" option," the user is presented with screen 120. Screen 120 provides a plurality of entry points into the selected contact list by allowing the user to enter the list at different alphabetical groupings or through a search function. If the user selects, for example, alphabetical grouping "A-F," he is directed to screen 122, which lists a plurality of contacts. The user device 100 need not store the entire contact list, but rather may download only portions of the contact list (such as different alphabetical groupings) as they are requested by the user.

From screen 112, a user may select one of the listed contacts, such as "Doe, Jane." Selection of one of the listed contacts may display further information about the contact or it may activate one Alternatively, if the user selects the "search" option, he is taken to search screen 124. The search screen 124 is provided with a text box into which a user can enter a search term, such as a name or partial email address. Upon selection the "search" button 128, the contact list client application searches for contact information containing the search term.

E. Contact List Data Format

The contact list client application can store contact list information in a variety of formats, particularly with the understanding that each of the contact list servers may employ a data format different from that of other contact list servers. Contact list information may be stored by the contact list client application in a form native to the contact list client application, or the contact list information may be stored in a form native to the contact list server from which it was taken.

In one embodiment, the contact list client application encapsulates contacts from a contact list server in a data structure. The data structure in such an embodiment keeps each contact in the form native to the contact list server from which it originated, but provides a wrapper containing metadata about the contact. The metadata may include, among other materials, data identifying the contact list server from which the contact was received, data indicating when the contact was received from the server, data indicating whether the contact has been edited at the client since it was received from the server, data regarding the format of the contact list data, and data identifying one or more communications applications associated with the contact. The data structure may also provide an index number or other unique record identifier for each contact.

In embodiments in which the client application encapsulates native contact list information in a data structure, flexible software programming techniques, such as object-oriented programming, may be used to allow code expansion and reuse for contact list information provided in different formats. Such techniques are not required, though, as the client application may alternatively, or in addition, be provided with software functionality to translate contact data between a format native to the client application and a format native to each contact list server.

Although various embodiments have been described herein, the scope of the invention is not limited to those embodiments, but rather is defined by the following claims.

The invention claimed is:

1. A method implemented by a client device, the method comprising:
   the client device receiving a first contact list from a first contact list server, the first contact list including at least a first contact, the first contact thus being associated with the first contact list server;
   the client device receiving a second contact list from a second contact list server, the second contact list including at least a second contact, the second contact thus being associated with the second contact list server;
   the client device merging at least the first contact list with the second contact list to form a merged contact list, wherein the merged contact list includes, for each contact, information identifying the contact list server with which the contact is associated;
   the client device storing the merged contact list;
   the client device receiving user input defining one or more revisions to a particular contact in the merged contact list; and
   the client device determining which contact list server the particular contact is associated with, and the client device communicating the one or more revisions of the particular contact to the determined contact list server, thereby facilitating update of the particular contact at the determined contact list server.

2. The method of claim 1, further comprising displaying the merged contact list to a user.

3. The method of claim 1, wherein the one or more revisions include deleting the particular contact from the merged contact list.

4. The method of claim 1, wherein the one or more revisions include modifying the particular contact.

5. The method of claim 1, wherein the client device includes a client application, the method comprising the client device operating the client application to carry out the method.

6. The method of claim 1, wherein the client device is a mobile telephone.

7. A client device comprising:
   a network interface;
   a processor;
   memory; and
   instructions stored in the memory and executable by the processor to implement functions including:
      (i) receiving from each of a plurality of contact list servers a respective contact list, including a first contact list from a first contact list server and a second contact list from a second contact list server, each contact list containing contacts;
      (ii) merging the received contact lists into a merged contact list, whereby each contact in the merged contact list is associated with the contact list server from which the client device received the contact list containing the contact;
      (iii) receiving user input defining one or more revisions to a particular contact in the merged contact list;
      (iv) determining which contact list server the particular contact is associated with, and the client device communicating the one or more revisions of the particular contact to the determined contact list server, thereby facilitating update of the particular contact at the determined contact list server.

8. The client device of claim 7, wherein the merged contact list includes, for each contact, information identifying the contact list server with which the contact is associated.

9. The client device of claim 7, wherein the instructions are further executable to display the merged contact list to a user.

10. The client device of claim 7, wherein the one or more revisions include deleting the particular contact from the merged contact list.

11. The client device of claim 7, wherein the one or more revisions include modifying the particular contact.

12. The client device of claim 7, wherein receiving the one or more revisions comprises receiving the one or more revisions via a touch-screen interface of the client device.

13. The client device of claim 7, wherein receiving the one or more revisions comprises receiving the one-or more revisions via a triple-tap text entry interface of the client device.

14. The client device of claim 7, wherein the client device is a mobile telephone.

* * * * *